UNITED STATES PATENT OFFICE.

WILLIAM W. DINWIDDIE, OF WEST ORANGE, NEW JERSEY.

PRODUCTION OF MOLDED ARTICLES.

1,353,152.   Specification of Letters Patent.   Patented Sept. 21, 1920.

No Drawing.   Application filed August 22, 1917.   Serial No. 187,579.

*To all whom it may concern:*

Be it known that I, WILLIAM W. DINWIDDIE, a citizen of the United States, and resident of West Orange, Essex county, New Jersey, have invented certain new and useful Improvements in the Production of Molded Articles, of which the following is a description.

My invention relates to the production of molded articles and more particularly to an improved method for molding such articles and to a composition used in carrying out such method to prevent the material of the articles molded from adhering to the molds when such articles are removed therefrom.

In molding articles formed of materials such as phenolic condensation products, rubber, shellac mixtures and various resinous materials, especially where a high pressure and heat are employed in the molding operation, much difficulty is experienced in removing the molded articles from the metallic molds usually employed, without more or less of the material of the articles adhering to the molds. This damages the articles and results in the rejection of an appreciable percentage thereof as faulty and also renders it necessary to wash or clean the molds after each molding operation.

I have discovered that these objections may be obviated by applying a coating of a solution of chlorid of tin, preferably stannous chlorid, to the molding surfaces of the mold previous to the molding operation in any suitable manner as by means of a soft cloth or by brushing. After so applying the solution of chlorid of tin, the molding surfaces of the molds are dried as by wiping the same with a cloth or by allowing the solvent of the chlorid of tin to evaporate. The material to be molded is then placed in the molds and subjected to the usual molding operation, preferably under a high heat and pressure, after which it is easily removable from the molds without any of the material adhering or sticking to the molding surfaces. In molding some materials it is necessary to apply the solution of chlorid of tin to the molding surfaces of the molds but infrequently. For example, in molding certain resinous mixtures I have found it necessary to apply the solution of chlorid of tin to the molding surfaces of the molds only once a day and sometimes even less frequently, according to the molding materials used, although these molds are used continuously between 40 and 50 times a day. Moreover this solution in no way affects or discolors the materials which have been molded in molds coated therewith, which materials include rubber, phenolic condensation products, rosin, and compositions containing rosin or shellac.

Various solvents may be used for the chlorid of tin including alcohols, and water. Water, however, is not as satisfactory as alcohol, as it is liable to result in the decomposition of the chlorid of tin. I find that it is preferable to employ an alcohol, such as denatured alcohol, as the solvent for the chlorid of tin and to produce the solution by dissolving the chlorid of tin in the alcohol in various proportions according to the material to be molded. For general use, however, the best results are obtained by the use of a solution produced by dissolving the chlorid of tin in alcohol in the proportion of about 50 grams of chlorid of tin to one gallon of alcohol.

While I have described the preferred manner in which my invention is carried out I wish it to be understood that the same is subject to various changes and modifications including the use of equivalents, without departing from the spirit of the invention and the scope of the appended claims.

Having now fully described my invention, what I claim as new and desire to protect by Letters Patent is as follows:

1. The process of producing molded articles which consists in applying chlorid of tin to a mold, then placing the material to be molded in the mold in direct contact with the chlorid of tin and molding the same, and removing the molded article from the mold, substantially as described.

2. The process of producing molded articles which consists in applying stannous chlorid to a mold, then placing the material to be molded in the mold in direct contact with the stannous chlorid and molding the same, and removing the molded article from the mold, substantially as described.

3. The process of producing molded articles which consists in applying a solution of chlorid of tin to the molding surface of a mold, then drying the molding surface, then placing the material to be molded in the mold in direct contact with the chlorid of tin on the surface of the mold and molding the same, and removing the molded article from the mold, substantially as described.

4. The process of producing molded articles which consists in applying a solution of chlorid of tin to a mold, then allowing the solvent in the solution so applied to evaporate, then placing the material to be molded in the mold in direct contact with the chlorid of tin on the surface of the mold and molding the same, and removing the molded article from the mold, substantially as described.

5. The process of producing molded articles which consists in applying a composition consisting of chlorid of tin dissolved in alcohol to a mold, then placing the material to be molded in the mold and molding the same, and removing the molded article from the mold, substantially as described.

6. The process of producing molded articles which consists in applying a composition consisting of stannous chlorid dissolved in alcohol to a mold, then placing the material to be molded in the mold and molding the same, and removing the molded article from the mold, substantially as described.

7. The process of producing molded articles which consists in applying chlorid of tin to a mold, then placing the material to be molded in the mold in direct contact with the chlorid of tin and molding the same under heat, and removing the molded article from the mold, substantially as described.

8. The process of producing molded articles which consists in applying a solution of chlorid of tin to a mold, then placing the material to be molded in the mold and molding the same under a high heat and pressure, and removing the molded article from the mold, substantially as described.

9. A mold having an outer surface coating of chlorid of tin, substantially as described.

10. A mold having an outer surface coating of stannous chlorid, substantially as described.

This specification signed and witnessed this 15 day of August, 1917.

WILLIAM W. DINWIDDIE.

Witnesses:
N. L. GREEN,
WILLIAM A. HARDY.